United States Patent
Murrells et al.

(10) Patent No.: US 11,209,972 B2
(45) Date of Patent: Dec. 28, 2021

(54) COMBINED TABLET SCREEN DRAG-AND-DROP INTERFACE

(71) Applicant: D&M Holdings, Inc., Kanagawa (JP)

(72) Inventors: Nicholas Murrells, San Diego, CA (US); Martin Richard Wachter, Phoenix, MD (US); Brendon Stead, Carlsbad, CA (US)

(73) Assignee: D&M Holdings, Inc., Kanagawa (JP)

( * ) Notice: Subject to any disclaimer, the term of this patent is extended or adjusted under 35 U.S.C. 154(b) by 312 days.

(21) Appl. No.: 14/842,877

(22) Filed: Sep. 2, 2015

(65) Prior Publication Data

US 2017/0060374 A1    Mar. 2, 2017

(51) Int. Cl.
*G06F 3/0486* (2013.01)
*G06F 3/0488* (2013.01)
(Continued)

(52) U.S. Cl.
CPC .......... *G06F 3/0486* (2013.01); *G06F 3/0482* (2013.01); *G06F 3/0488* (2013.01); *G06F 3/165* (2013.01); *G06F 2200/1637* (2013.01)

(58) Field of Classification Search
CPC .... G06F 3/0488; G06F 3/0486; G06F 3/0482; G06F 3/04842; G06F 3/0481; G06F 3/04886; G06F 3/0416; G06F 3/041; G06F 2203/04803; G06F 3/04817; G06F 3/017; G06F 3/04845; G06F 3/048; G06F 3/044;
(Continued)

(56) References Cited

U.S. PATENT DOCUMENTS

| 5,487,143 A | * | 1/1996 | Southgate ............. G06F 3/0481 715/790 |
| 5,838,384 A | | 11/1998 | Schindler et al. |

(Continued)

FOREIGN PATENT DOCUMENTS

| WO | 2014074089 | 5/2014 |
| WO | 2014094877 | 6/2014 |

OTHER PUBLICATIONS

D. Raneburger, R. Popp, D. Alonso-Ríos, H. Kaind and J. Falb, "A User Study with GUIs Tailored for Smartphones and Tablet PCs," 2013 IEEE International Conference on Systems, Man, and Cybernetics, Manchester, 2013, pp. 3727-3732, doi: 10.1109/SMC.2013.635. (Year: 2013).*

(Continued)

*Primary Examiner* — Tuyetlien T Tran
(74) *Attorney, Agent, or Firm* — Peter A. Nieves; Sheehan Phinney Bass & Green PA (57) ABSTRACT

A media rendering system includes a media rendering device and a controller device in communication via a network. The controller has a touch screen, presenting a portrait display mode when oriented in a first position, and a landscape display mode when oriented in a second position. The portrait mode displays either a first full screen presenting a first menu, or a second full screen presenting a second menu. The landscape mode displays a landscape full screen with two side-by-side tiles including a first tile presenting the first menu and a second tile presenting the second menu. Landscape mode provides drag-and-drop functionality for menu objects among the first and second, generating configuration commands to the media rendering device.

20 Claims, 7 Drawing Sheets

(51) Int. Cl.
*G06F 3/0482* (2013.01)
*G06F 3/16* (2006.01)

(58) Field of Classification Search
CPC ............ G06F 3/0485; G06F 17/30274; G06F 17/308; G06F 3/0346; G06F 3/142; G06F 3/04847; G06F 3/0236; G06F 16/287; G06F 16/44; G06F 16/438; G06F 16/54; G06F 16/986; G06F 16/41; G06F 16/9577; G06F 3/165; G06F 2200/1637; G06F 3/0483; H04L 67/10; H04N 21/2665
See application file for complete search history.

(56) References Cited

U.S. PATENT DOCUMENTS

| | | | |
|---|---|---|---|
| 6,359,656 B1 | 3/2002 | Huckins | |
| 6,650,963 B2 | 11/2003 | DiLorenzo | |
| 6,934,740 B1* | 8/2005 | Lawande | G06F 16/80 |
| | | | 709/213 |
| 6,976,062 B1 | 12/2005 | Ostermann | |
| 7,119,266 B1* | 10/2006 | Bittner | G09B 15/023 |
| | | | 84/477 R |
| 7,130,608 B2 | 10/2006 | Hollstrom | |
| 7,130,616 B2 | 10/2006 | Janik | |
| 7,149,549 B1 | 12/2006 | Ortiz et al. | |
| 7,313,540 B1* | 12/2007 | Hueler | G06Q 40/00 |
| | | | 340/307 |
| 7,337,409 B2* | 2/2008 | Doblmayr | G06F 3/0486 |
| | | | 715/769 |
| 7,373,414 B2 | 5/2008 | Evron et al. | |
| 7,412,060 B2* | 8/2008 | Fukuda | G06F 21/10 |
| | | | 348/E7.056 |
| 7,571,014 B1 | 8/2009 | Lambourne | |
| 7,574,691 B2 | 8/2009 | Freitas et al. | |
| 7,630,501 B2 | 12/2009 | Blank et al. | |
| 7,689,510 B2 | 3/2010 | Lamkin et al. | |
| 7,791,594 B2 | 9/2010 | Bunko | |
| 7,792,311 B1 | 9/2010 | Holmgren et al. | |
| 7,978,176 B2 | 7/2011 | Forstall et al. | |
| 8,095,191 B2* | 1/2012 | Gorsica | H04M 1/0243 |
| | | | 455/128 |
| 8,111,132 B2 | 2/2012 | Allen et al. | |
| 8,116,476 B2 | 2/2012 | Inohara | |
| 8,131,389 B1 | 3/2012 | Hardwick et al. | |
| 8,214,447 B2 | 7/2012 | Deslippe et al. | |
| 8,239,910 B2 | 8/2012 | Anderson, Jr. et al. | |
| 8,243,949 B2 | 8/2012 | Bhow et al. | |
| 8,245,143 B2 | 8/2012 | Yach et al. | |
| 8,266,550 B1* | 9/2012 | Cleron | G06F 1/1633 |
| | | | 345/173 |
| 8,290,172 B2 | 10/2012 | Langelle | |
| 8,290,603 B1 | 10/2012 | Lambourne | |
| 8,368,723 B1* | 2/2013 | Gossweiler, III | G06K 9/00261 |
| | | | 345/660 |
| 8,724,600 B2 | 5/2014 | Ramsey | |
| 8,769,431 B1* | 7/2014 | Prasad | G06F 3/048 |
| | | | 715/764 |
| 8,788,080 B1 | 7/2014 | Kallai et al. | |
| 8,812,051 B2 | 8/2014 | Jouin | |
| 8,832,823 B2 | 9/2014 | Boss et al. | |
| 8,887,071 B2 | 11/2014 | Yang | |
| 9,001,047 B2 | 4/2015 | Forstall | |
| 9,104,301 B2* | 8/2015 | Kim | G06F 3/04817 |
| 9,239,662 B2* | 1/2016 | Matas | G06F 3/017 |
| 9,288,596 B2 | 3/2016 | Gossain | |
| 9,311,426 B2* | 4/2016 | Stovicek | G06F 16/9577 |
| 9,342,234 B2* | 5/2016 | Kobayashi | G06F 3/0486 |
| 9,395,871 B2 | 7/2016 | Marra | |
| 9,504,076 B2 | 11/2016 | El-Hoiydi | |
| 9,640,158 B1* | 5/2017 | Baker | G10H 1/0008 |
| 9,654,073 B2 | 5/2017 | Apodaca | |
| 9,671,997 B2 | 6/2017 | Triplet | |
| 9,703,471 B2* | 7/2017 | Wachter | G06F 3/14 |
| 9,996,161 B2* | 6/2018 | Le Grand | G09G 5/003 |
| 9,999,091 B2 | 6/2018 | Wachter | |
| 10,051,103 B1* | 8/2018 | Gordon | G06F 9/451 |
| 10,055,108 B2 | 8/2018 | Bates | |
| 2002/0003548 A1 | 1/2002 | Krusche et al. | |
| 2002/0055788 A1 | 5/2002 | Petrie et al. | |
| 2002/0101997 A1 | 8/2002 | Curtis et al. | |
| 2002/0133327 A1 | 9/2002 | McGrath | |
| 2002/0170061 A1 | 11/2002 | DiLorenzo | |
| 2003/0020763 A1 | 1/2003 | Mayer et al. | |
| 2003/0029918 A1 | 2/2003 | Leanheart et al. | |
| 2003/0161292 A1 | 8/2003 | Silvester | |
| 2003/0208300 A1 | 11/2003 | DiLorenzo | |
| 2004/0066414 A1* | 4/2004 | Czerwinski | G06F 3/0481 |
| | | | 715/781 |
| 2004/0162025 A1 | 8/2004 | Plummer | |
| 2005/0094610 A1 | 5/2005 | De Clerq et al. | |
| 2005/0111672 A1 | 5/2005 | Chen | |
| 2005/0195986 A1 | 9/2005 | McCarty et al. | |
| 2005/0262201 A1 | 11/2005 | Rudolph et al. | |
| 2006/0258419 A1* | 11/2006 | Winkler | A63F 13/52 |
| | | | 463/1 |
| 2006/0281477 A1 | 12/2006 | Downes | |
| 2007/0022207 A1 | 1/2007 | Millington | |
| 2007/0162953 A1* | 7/2007 | Bolliger | G06F 17/30056 |
| | | | 725/142 |
| 2007/0223398 A1 | 9/2007 | Luo et al. | |
| 2007/0297459 A1 | 12/2007 | Cucos et al. | |
| 2008/0010648 A1 | 1/2008 | Ando et al. | |
| 2008/0092204 A1 | 4/2008 | Bryce et al. | |
| 2008/0165153 A1* | 7/2008 | Platzer | G06F 1/1626 |
| | | | 345/173 |
| 2008/0215959 A1* | 9/2008 | Lection | G11B 27/34 |
| | | | 715/201 |
| 2008/0222295 A1 | 9/2008 | Robinson et al. | |
| 2008/0271080 A1* | 10/2008 | Gossweiler | G06F 3/0486 |
| | | | 725/47 |
| 2008/0282158 A1* | 11/2008 | Aaltonen | G06F 3/0482 |
| | | | 715/700 |
| 2008/0313568 A1 | 12/2008 | Park et al. | |
| 2009/0002335 A1* | 1/2009 | Chaudhri | G06F 16/904 |
| | | | 345/173 |
| 2009/0094317 A1 | 4/2009 | Venkitaraman | |
| 2009/0169030 A1 | 7/2009 | Inohara | |
| 2009/0171487 A1 | 7/2009 | Wilhelm | |
| 2009/0172542 A1 | 7/2009 | Girish et al. | |
| 2009/0187842 A1 | 7/2009 | Collins et al. | |
| 2009/0191854 A1* | 7/2009 | Beason | H04M 1/04 |
| | | | 455/418 |
| 2009/0228919 A1 | 9/2009 | Zott et al. | |
| 2009/0254861 A1* | 10/2009 | Seetharamakrishnan | |
| | | | G11B 27/34 |
| | | | 715/810 |
| 2009/0258598 A1 | 10/2009 | Shin et al. | |
| 2010/0058168 A1 | 3/2010 | Shah et al. | |
| 2010/0088590 A1* | 4/2010 | Bajohr | G06F 40/166 |
| | | | 715/235 |
| 2010/0088639 A1* | 4/2010 | Yach | G06F 1/1626 |
| | | | 715/825 |
| 2010/0121919 A1 | 5/2010 | Hepworth et al. | |
| 2010/0131869 A1* | 5/2010 | Adachi | G06F 8/34 |
| | | | 715/760 |
| 2010/0138782 A1* | 6/2010 | Rainisto | G06F 3/0482 |
| | | | 715/808 |
| 2010/0216515 A1* | 8/2010 | White | G06F 1/1694 |
| | | | 455/566 |
| 2010/0240390 A1* | 9/2010 | Russ | H04M 1/0256 |
| | | | 455/456.1 |
| 2010/0259547 A1* | 10/2010 | de Aguiar | G06T 13/40 |
| | | | 345/474 |
| 2010/0260348 A1 | 10/2010 | Bhow et al. | |
| 2010/0272270 A1 | 10/2010 | Chaikin | |
| 2010/0284389 A1 | 11/2010 | Ramsay et al. | |
| 2010/0299639 A1 | 11/2010 | Ramsay | |
| 2010/0318917 A1 | 12/2010 | Holladay et al. | |

(56) References Cited

U.S. PATENT DOCUMENTS

| | | | |
|---|---|---|---|
| 2010/0325211 A1* | 12/2010 | Ylinen | G06Q 10/06 709/205 |
| 2011/0004517 A1* | 1/2011 | Soto | G06Q 30/0251 705/14.51 |
| 2011/0028083 A1 | 2/2011 | Soitis | |
| 2011/0041086 A1* | 2/2011 | Kim | G06F 3/0488 715/764 |
| 2011/0074710 A1* | 3/2011 | Weeldreyer | G06F 3/0481 345/173 |
| 2011/0211219 A1 | 9/2011 | Bradley et al. | |
| 2011/0225539 A1* | 9/2011 | Lee | G06F 3/0485 715/784 |
| 2012/0032981 A1* | 2/2012 | Hackwell | G06F 15/0291 345/650 |
| 2012/0051560 A1 | 3/2012 | Sanders | |
| 2012/0054143 A1* | 3/2012 | Doig | G06Q 30/0269 706/47 |
| 2012/0057725 A1 | 3/2012 | Nakamura | |
| 2012/0072853 A1* | 3/2012 | Krigstrom | G06F 3/0486 715/748 |
| 2012/0084712 A1* | 4/2012 | Gimpl | G06F 1/1616 715/788 |
| 2012/0099594 A1 | 4/2012 | Lau et al. | |
| 2012/0113224 A1 | 5/2012 | Nguyen et al. | |
| 2012/0117598 A1 | 5/2012 | Pons et al. | |
| 2012/0190386 A1* | 7/2012 | Anderson | G01S 19/14 455/456.3 |
| 2012/0192070 A1 | 7/2012 | De Faria et al. | |
| 2012/0240055 A1* | 9/2012 | Webber | G06Q 10/107 715/752 |
| 2012/0262489 A1* | 10/2012 | Caliendo, Jr. | G06F 3/04817 345/652 |
| 2012/0263318 A1 | 10/2012 | Millington | |
| 2012/0269361 A1 | 10/2012 | Bhow et al. | |
| 2012/0290965 A1* | 11/2012 | Ignor | G06F 3/0482 715/777 |
| 2012/0310703 A1 | 12/2012 | Cavalcanti et al. | |
| 2013/0002568 A1* | 1/2013 | Selim | G06F 1/1616 345/173 |
| 2013/0030892 A1* | 1/2013 | Liu | G06Q 30/02 705/14.16 |
| 2013/0073932 A1* | 3/2013 | Migos | G06F 15/0291 715/201 |
| 2013/0076651 A1 | 3/2013 | Reimann et al. | |
| 2013/0080955 A1* | 3/2013 | Reimann | G06F 3/04842 715/769 |
| 2013/0080966 A1* | 3/2013 | Kikin-Gil | G06F 3/0483 715/776 |
| 2013/0089026 A1 | 4/2013 | Piper et al. | |
| 2013/0109928 A1* | 5/2013 | Menzel | G16H 40/63 600/301 |
| 2013/0154950 A1 | 6/2013 | Kvasnica | |
| 2013/0159928 A1* | 6/2013 | Joynes | A63F 13/533 715/810 |
| 2013/0173794 A1 | 7/2013 | Agerbak et al. | |
| 2013/0187861 A1* | 7/2013 | Lavallee | G06F 9/543 345/173 |
| 2013/0231044 A1 | 9/2013 | Wang | |
| 2013/0238724 A1* | 9/2013 | Cunningham | G06F 3/04842 709/206 |
| 2013/0246916 A1 | 9/2013 | Reimann | |
| 2013/0265235 A1* | 10/2013 | Cai | G06F 3/0488 345/169 |
| 2013/0275901 A1 | 10/2013 | Saas et al. | |
| 2013/0290888 A1 | 10/2013 | Reimann et al. | |
| 2013/0305152 A1 | 11/2013 | Griffiths et al. | |
| 2013/0311912 A1 | 11/2013 | Aso | |
| 2013/0321340 A1* | 12/2013 | Seo | G06F 1/1641 345/174 |
| 2013/0334300 A1* | 12/2013 | Evans | G06Q 10/06 235/375 |
| 2013/0339907 A1* | 12/2013 | Matas | G06T 11/60 715/853 |
| 2013/0340003 A1 | 12/2013 | Davis et al. | |
| 2014/0009676 A1 | 1/2014 | Cannistraro | |
| 2014/0013254 A1* | 1/2014 | Hosein | G06F 3/04817 715/765 |
| 2014/0022285 A1* | 1/2014 | Stovicek | G06F 3/04886 345/650 |
| 2014/0026088 A1* | 1/2014 | Monte | G06F 3/04855 715/765 |
| 2014/0047487 A1 | 2/2014 | Guedalia et al. | |
| 2014/0057569 A1 | 2/2014 | Toivanen et al. | |
| 2014/0064492 A1 | 3/2014 | Lakkundi | |
| 2014/0068475 A1* | 3/2014 | Li | G06F 16/95 715/765 |
| 2014/0072270 A1* | 3/2014 | Goldberg | H04N 21/4312 386/223 |
| 2014/0075394 A1* | 3/2014 | Nawle | H04M 1/72519 715/863 |
| 2014/0078178 A1 | 3/2014 | Li | |
| 2014/0089832 A1* | 3/2014 | Kim | G06F 3/0486 715/769 |
| 2014/0096002 A1* | 4/2014 | Dey | G06F 3/0488 715/723 |
| 2014/0154983 A1 | 6/2014 | Schultz et al. | |
| 2014/0157166 A1* | 6/2014 | Choi | G06F 3/04817 715/769 |
| 2014/0169569 A1 | 6/2014 | Toivanen et al. | |
| 2014/0181654 A1 | 6/2014 | Kumar et al. | |
| 2014/0193047 A1* | 7/2014 | Grosz | G06Q 10/10 382/118 |
| 2014/0195921 A1* | 7/2014 | Grosz | G06Q 30/0601 715/738 |
| 2014/0195953 A1* | 7/2014 | Sakai | G06F 3/04883 715/771 |
| 2014/0201635 A1 | 7/2014 | Kumar | |
| 2014/0210860 A1* | 7/2014 | Caissy | G06F 3/0338 345/659 |
| 2014/0213372 A1* | 7/2014 | Liang | A63F 13/2145 463/43 |
| 2014/0219483 A1 | 8/2014 | Hong | |
| 2014/0229959 A1 | 8/2014 | Beckhardt et al. | |
| 2014/0242913 A1 | 8/2014 | Pang | |
| 2014/0270235 A1 | 9/2014 | Shin et al. | |
| 2014/0270306 A1 | 9/2014 | Luna et al. | |
| 2014/0274185 A1 | 9/2014 | Luna et al. | |
| 2014/0279889 A1 | 9/2014 | Luna | |
| 2014/0283136 A1 | 9/2014 | Dougherty et al. | |
| 2014/0289597 A1* | 9/2014 | Kim | G06F 16/957 715/205 |
| 2014/0289642 A1* | 9/2014 | Prasad | G06F 3/048 715/745 |
| 2014/0310597 A1 | 10/2014 | Triplett et al. | |
| 2014/0334644 A1 | 11/2014 | Selig et al. | |
| 2014/0359496 A1* | 12/2014 | Cammarata | G06F 3/0484 715/763 |
| 2014/0368441 A1* | 12/2014 | Touloumlzis | G06F 3/017 345/173 |
| 2014/0368547 A1* | 12/2014 | Elings | G06F 3/04886 345/659 |
| 2014/0370817 A1 | 12/2014 | Luna | |
| 2014/0380159 A1 | 12/2014 | Reilly et al. | |
| 2014/0380219 A1* | 12/2014 | Cartan | G06F 3/04842 715/771 |
| 2614/0356389 | 12/2014 | Reunamaki | |
| 2015/0022558 A1* | 1/2015 | Li | G06F 1/1694 345/650 |
| 2015/0025661 A1 | 1/2015 | Vega-Zayas et al. | |
| 2015/0045000 A1* | 2/2015 | Kim | G06F 3/0488 455/411 |
| 2015/0086045 A1 | 3/2015 | Millington et al. | |
| 2015/0091708 A1 | 4/2015 | Tan et al. | |
| 2015/0094120 A1* | 4/2015 | Suh | G06F 3/04883 455/566 |
| 2015/0116218 A1* | 4/2015 | Yang | G06F 21/31 345/158 |
| 2015/0161141 A1* | 6/2015 | Evans | G06F 16/44 715/243 |
| 2015/0181010 A1 | 6/2015 | Bran | |

(56) References Cited

U.S. PATENT DOCUMENTS

| | | |
|---|---|---|
| 2015/0192940 A1 | 7/2015 | Silva et al. |
| 2015/0193135 A1* | 7/2015 | Kim .................. G06F 3/04847 |
| | | 715/747 |
| 2015/0195649 A1 | 7/2015 | Vogt |
| 2015/0256957 A1 | 9/2015 | Kim et al. |
| 2015/0262396 A1* | 9/2015 | Devarajan ............ G06F 3/0486 |
| | | 345/440.1 |
| 2015/0286360 A1 | 10/2015 | Wachter |
| 2015/0293655 A1 | 10/2015 | Tan |
| 2016/0026371 A1* | 1/2016 | Lu ........................ G06F 3/04886 |
| | | 715/765 |
| 2016/0026428 A1 | 1/2016 | Morganstern et al. |
| 2016/0103586 A1* | 4/2016 | Greenberg ............ G06F 3/0488 |
| | | 715/739 |
| 2016/0117072 A1* | 4/2016 | Sharifi ................ G06F 3/04842 |
| | | 715/769 |
| 2016/0124635 A1* | 5/2016 | Covington ............ G01M 17/00 |
| | | 345/440 |
| 2016/0162127 A1* | 6/2016 | Sepulveda .............. G06F 9/452 |
| | | 715/777 |
| 2016/0328789 A1* | 11/2016 | Grosz ................... G06F 3/1205 |
| 2016/0335041 A1* | 11/2016 | Wachter ................ G06F 3/0486 |
| 2017/0060374 A1 | 3/2017 | Murrells et al. |
| 2017/0272860 A1 | 9/2017 | Ludovic |
| 2017/0351900 A1* | 12/2017 | Lee ........................ G05D 1/0094 |
| 2017/0357317 A1* | 12/2017 | Chaudhri ............. G06F 3/0412 |
| 2017/0357437 A1* | 12/2017 | Peterson .............. G06F 3/0486 |
| 2017/0357477 A1 | 12/2017 | Im et al. |
| 2018/0032997 A1* | 2/2018 | Gordon .............. G06Q 30/0269 |
| 2018/0136898 A1 | 5/2018 | Shi et al. |
| 2018/0255398 A1 | 9/2018 | Fischer et al. |
| 2019/0163339 A1* | 5/2019 | Zhu .......................... G06F 40/30 |
| 2020/0242298 A1* | 7/2020 | Allen .................... G06F 40/166 |

OTHER PUBLICATIONS

Megan Yen et al., "Portable Music Player User Interface Concepts: A Synaptics White Paper", IP.com Prior Art Database Technical Disclosure, Jun. 2, 2005, pp. 1-32 (Year: 2005).*

Disclosed Anonymously, "Layout Profile Manager for multi-orientation screen devices", IP.com Prior Art Database Technical Disclosure, Nov. 1, 2006, pp. 1-4 (Year: 2006).*

International Search Report and Written Opinion for PCT/US16/32092 dated Oct. 14, 2016.

International Search Report and Written Opinion for PCT/US16/49425 dated Oct. 28, 2016.

Cheng, et al, IrotateGrasp: automatic screen rotation based on grasp of mobile devices. Proceedings of the SIGCHI conference on Human Factors in computing Systems; 3051-3054; 2013.

Kim et al; Huffman user interface for fill touch screen based mobile phones. Proceedings of the 12th International Conference on Advanced Communication Technology; 1021-1026; 2010.

International Search Report for PCT/US16/31964 dated Aug. 18, 2016.

European Search Report for application 16793488.4 dated Sep. 12, 2018.

European Search Report for application 16793522.0 dated Sep. 12, 2018.

* cited by examiner

COMBINED TABLET SCREEN DRAG-AND-DROP INTERFACE

FIELD OF THE INVENTION

The present invention relates to media rendering devices, and more particularly, is related to a user interface for controlling a media rendering device.

BACKGROUND OF THE INVENTION

It has become commonplace for an individual to have access to one or more devices that render media, such as an mp3 player, a car stereo, a home entertainment system, a portable computer or tablet, a gaming console, and a smart phone, among others. The rendering devices may have access to a communication network and/or the internet, and may be configured to render digital media provided over the communication network and/or the internet, for example, a digital media streaming service.

Platform based applications hosted by portable controller devices, such as a smart phone or tablet, may control one or more rendering devices. However, controlling multiple rendering devices with a single controller device may be confusing and/or cumbersome.

Figure 1:
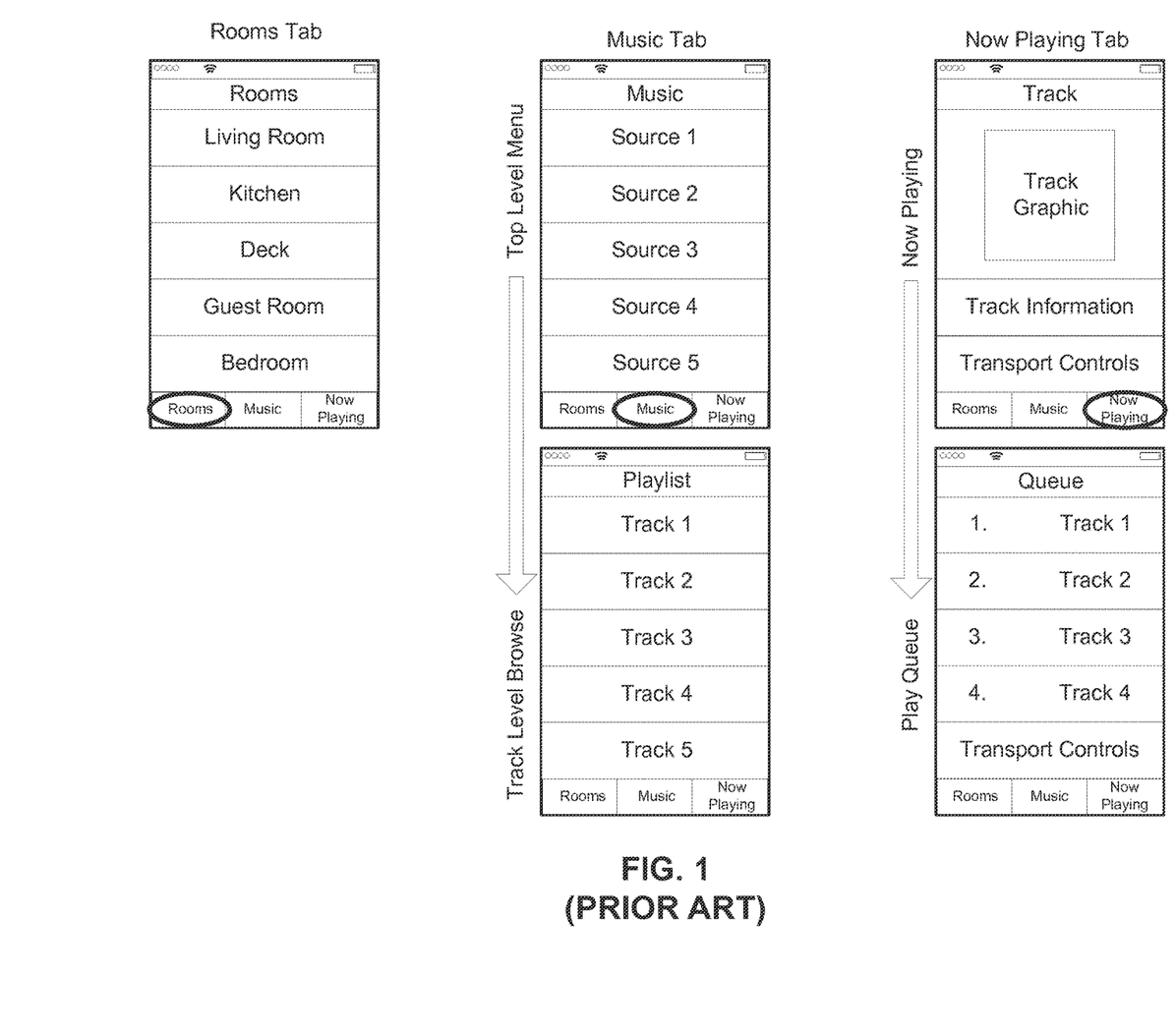
FIG. 1 is a schematic diagram of screenshots of a prior art controller for a media rendering system.

For example, FIG. 1 shows a series of screen shots of a controller screen configured to control a media rendering device. The controller may be an application (or "app") running on a handheld computing device, such as a smart phone or tablet computer. The screens shown in FIG. 1 are oriented in portrait mode. Each of the screens includes three tabs at the bottom, labeled "Rooms," "Music," and "Now Playing." Selecting a tab results in the screen displaying the top level or last used menu for the selected tab. In FIG. 1, the first column displays the Rooms tab, the second column displays the Music tab, and the third column displays the Now Playing tab. The top row shows the top level menu for each tab, and the bottom row displays a secondary menu for the tab (if any).

As shown in the first column of FIG. 1, the Rooms tab allows the user to select one of two or more rooms with a media rendering device located therein. By selecting a room, such as "Living Room," "Kitchen," Deck," "Guest Room," or "Bedroom," the controller selects the rendering device within that room to control, and the other tabs may display information pertaining to the rendering device in the selected room when selected.

As shown in the second column of FIG. 1, the Music Tab top level menu displays a list of music sources. For example, a music source may be a streaming source, such as "Pandora" or "Spotify," a radio station, or a local playlist, among other sources. Selecting a music source displays a playlist of tracks associated with the music source in the "Track Level Browse" screen. The playlist supplants the music source list in the Music Tab.

As shown in the third column of FIG. 1, the Now Playing Tab top level menu displays information regarding the track (media file) currently being rendered. For example, the screen may display a graphic associated with the track, such as an album cover or photograph of the recording artist, and information regarding the track, such as the title, collection, duration, or other information. Transport controls, such as play/pause, forward and reverse, as well as volume level may also be displayed. The current play queue may be displayed, for example, by swiping downward on the now playing screen. The play queue lists upcoming tracks in the order they are scheduled to be played (rendered).

While the above described user interface provides access to many functions, it may not be simple or intuitive to coordinate activities/functions among the various screens. Therefore, there is a need in the industry to address one or more of the abovementioned shortcomings.

SUMMARY OF THE INVENTION

Embodiments of the present invention provide a combined tablet screen drag-and-drop interface. Briefly described, the present invention is directed to a media rendering system with a media rendering device and a controller device in communication via a network. The controller has a touch screen, presenting a portrait display mode when oriented in a first position, and a landscape display mode when oriented in a second position. The portrait mode displays either a first full screen presenting a first menu, or a second full screen presenting a second menu. The landscape mode displays a landscape full screen with two side-by-side tiles including a first tile presenting the first menu and a second tile presenting the second menu. Landscape mode provides drag-and-drop functionality for menu objects among the first and second, generating configuration commands to the media rendering device.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principals of the invention.

DETAILED DESCRIPTION

The following definitions are useful for interpreting terms applied to features of the embodiments disclosed herein, and are meant only to define elements within the disclosure.

As used within this disclosure, "media" refers to audio and/or video content either stored on a storage medium, such as a disk drive or digital disk, or streamed from a media server. Media may refer to analog and/or digitally formatted data. A specific recorded performance is referred to as a media recording.

As used within this disclosure, an originating provider of media, either streamed or locally stored, is referred to as a "media source." Examples of a media source include a music and/or video server, an internet radio station, a streaming service, or a cache of media files.

As used within this disclosure, "rendering" refers to playback of a media recording by a media player, also referred to herein as a "rendering device." Examples of rendering devices include, but are not limited to, an mp3 player, a tablet computer, a portable stereo, a home entertainment system, a portable video player, a smart phone, a laptop or desktop computer, and a mobile entertainment system. A rendering device generally has at least one audio transducer (speaker) used to render the media audio portion.

As used within this disclosure, a "controller" refers to a hand held device or an application running on a hand held device configured to interact with a media rendering device. The controller may interact with the media rendering device by issuing commands to adjust one or more operating parameters on the media rendering device, and/or to display operational status of the media rendering device. Examples of a hand held device include a smart phone or tablet computer.

As used within this disclosure, a "user" refers to a person consuming media from a media rendering device, and/or a person operating a controller for the media rendering device.

As used within this disclosure, "cue point" refers a playback time location in a rendered media recording.

As used within this disclosure, "portrait mode" refers to an operation configuration of a controller device corresponding to orientation of a display screen where the top and bottom edges of the display screen are shorter than the side edges.

As used within this disclosure, "landscape mode" refers to an operation configuration of a controller device corresponding to orientation of a display screen where the top and bottom edges of the display screen are longer than the side edges. In both portrait and landscape mode, text on the display is generally arranged to be oriented with respect to the top edge of the screen.

As used within this disclosure, a local device, such as a server, refers to a network element directly connected to a local area network (LAN), while a remote device refers to an item that may be in communication with local network elements, for example, via the internet, but is not directly connected to the LAN. Examples of a LAN include a wireless (WiFi) LAN or a wired LAN, for example, connected via Ethernet cables.

As used within this disclosure, a "playlist" is a modifiable data structure containing an ordered list of media, or an ordered list of references to media. A playlist may be stored, for example, on a rendering device or a server, or within a storage medium, such as a hard drive, thumb drive, or optical disc. A playlist may be modified to add, remove, and/or re-order media or media references. Since playlists containing media references do not contain audio or video content, they are generally small in size and therefore readily transportable. A display playlist is a text listing of media in a playlist, and may include a subset of identifying parameters of a media, such as title, artist, duration, and date, among others. A play queue refers to a playlist that is currently being rendered by a rendering device. The head of the play queue refers to the next media file to be rendered after the currently rendered media recording, while the tail of the play queue refers to the location of the play queue indicating the final media in the play queue to be rendered.

As used within this disclosure, "streaming" refers to a process of real-time transmitting of a media recording by a source to a rendering device. The rendering device may begin rendering the media before the entire recording has been transmitted. Streaming is generally transitory, such that the streamed data is not retained after it has been rendered. Portions of a received stream may be buffered for rendering, for example, to ensure rendering is uninterrupted during short interruptions of the streamed transmission. In contrast, a downloaded digital multimedia file is generally received in its entirety before it may be rendered. A downloaded digital multimedia file is generally retained in a memory for subsequent rendering, while a streamed file is generally re-streamed for subsequent renderings. "Streaming a song" is shorthand for streaming audio media.

As used within this disclosure, "GUI" is a graphical user interface, and in particular, may be a touch-screen interface. A graphical user interface or GUI, sometimes pronounced /ˈɡuːi/ ("gooey") is a type of interface that allows users to interact with electronic devices through graphical icons and visual indicators such as secondary notation, referred to herein as "objects," as opposed to text-based interfaces, typed command labels or text navigation. An ordered list of objects in a GUI may be referred to as a "menu." Menus may be stationary, may drop down from top of the display (a "drop-down menu"), or may pop up to fill the screen or a portion of the screen when an object is selected (a "pop-up menu"). The actions in a GUI are usually performed through direct manipulation of the objects. As used herein, "selecting" refers to touching an object, for example with a finger or stylus. A "drag-and-drop" operation refers to selecting a first object with a touch of the touchscreen, and moving the finger/stylus from the first object to another location (often with a ghost or outline of the object tracking the movement) corresponding to a second object. The second object may become highlighted when the ghost is dragged over it, indicating the second object is able to "receive" the first object. The drag-and-drop operation may be thought of providing the dragged object as an input to the second object. The operation resulting from the drag-and-drop operation is generally generation of a command to a media rendering device controlled by the controller, the scope of which may depend upon context or the mode of the display during the operation.

An object refers to an item represented by a graphical icon or visual indicator, for example, a media source, a media file, or a media rendering device.

Reference will now be made in detail to embodiments of the present invention, examples of which are illustrated in the accompanying drawings. Wherever possible, the same reference numbers are used in the drawings and the description to refer to the same or like parts.

Figure 2:
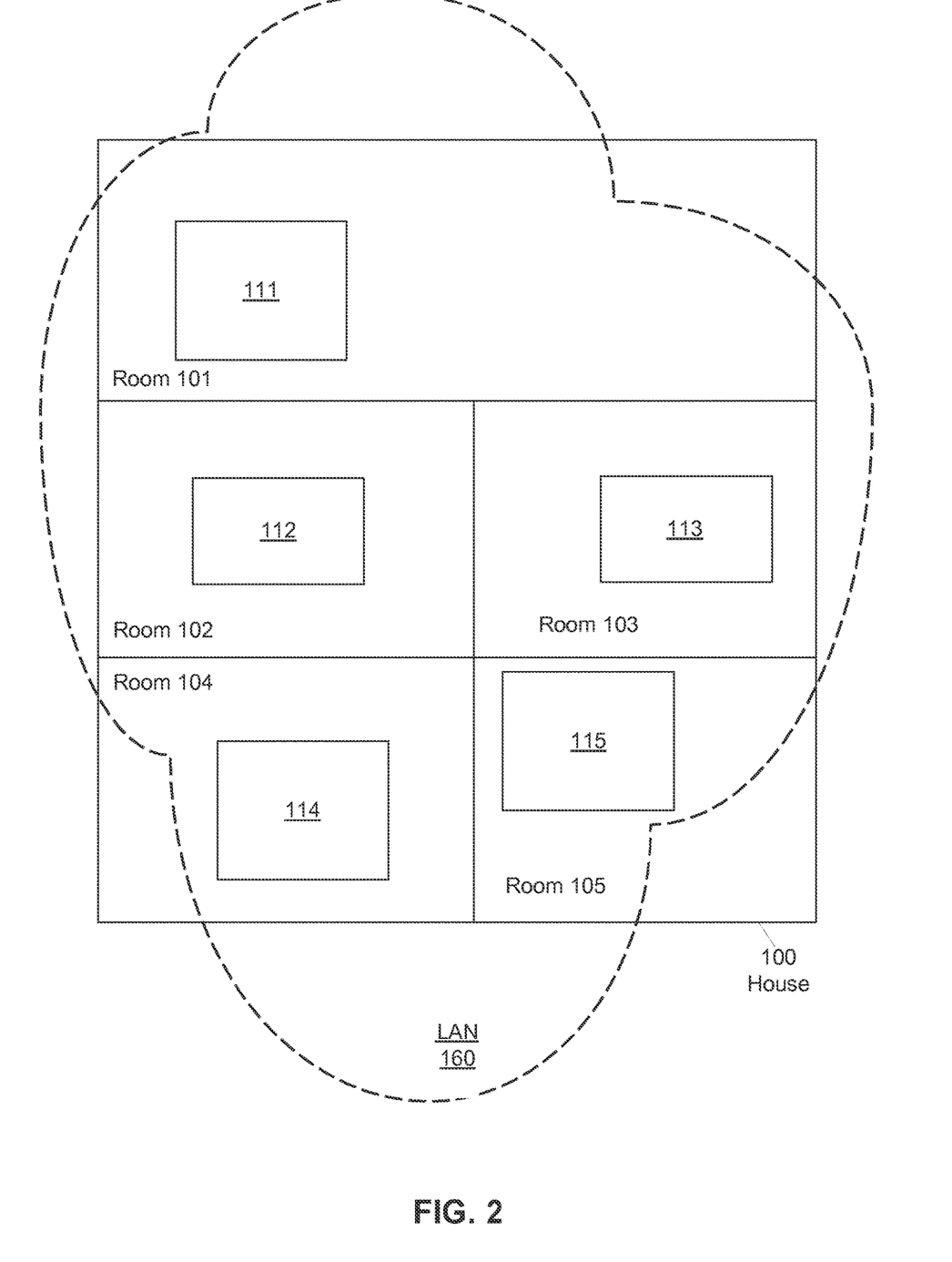
FIG. 2 is a schematic diagram of a premises containing multiple networked media rendering devices.

FIG. 2 shows an exemplary embodiment of a system with multiple media rendering devices. A house 100 includes five media rendering devices 111-115 arranged in five rooms 101-105. The house 100 is served by a local area network (LAN) 160, for example, a household wireless network. The first room 101 includes a first media rendering device 111. The second room 102 includes the second media rendering device 112. The third room 103 includes the third media rendering device 113. The fourth room 104 includes the fourth media rendering device 114. The fifth room 105 includes the fifth media rendering device 115.

Each of the five media rendering devices 111-115 may be in communication with one or more controllers (not shown) via the LAN 160. Alternatively, a control panel on one or more of the media rendering devices 111-115 may serve as a controller for all of the media rendering devices 111-115. The media rendering devices 111-115 may be individually controlled, or two or more rendering devices 111-115 may be linked so that they may operate under common control.

Figure 3A:
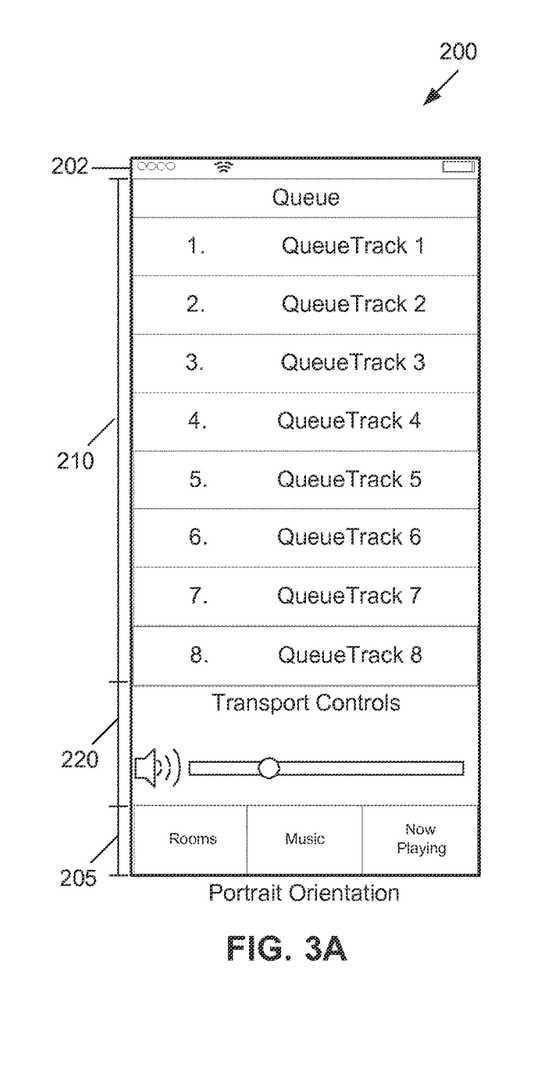
FIG. 3A is a schematic diagram of a screen of a first embodiment of a controller for a media rendering system in portrait orientation.
Figure 3B:
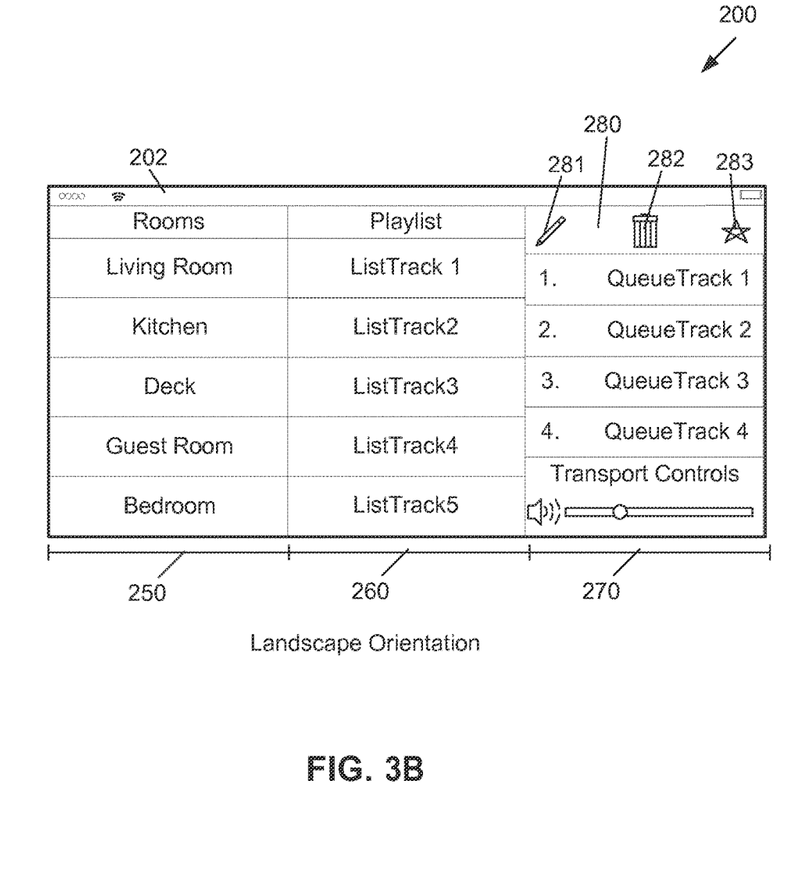
FIG. 3B is a schematic diagram of a screen of the first embodiment in landscape orientation.

As described above, navigating multiple control screens in a controller application may be cumbersome. There are advantages provided by combining the content of two or more of these screens. For example, while a single screen may be displayed in portrait orientation, two or more screens may be displayed as side-by-side tiles 250, 260, 270 in landscape orientation, as shown in FIG. 3. The tiles 250, 260, 270 may show shortened or otherwise reduced versions of the menus displayed in portrait orientation.

As shown in FIG. 3A user interface 200 for a controller, such as a handheld computing device with a touchscreen display hosts an application (or "app") to control the multi-room speaker system in the LAN 160 (FIG. 2). The controller has an orientation sensor, such that the control device may determine the orientation of the display screen, and change the presentation of the display screen accordingly. The user interface 200 has a first display mode when oriented in a vertical (portrait) position, as shown in FIG. 3A, and a second display mode when oriented in a horizontal (landscape) position, as shown in FIG. 3B.

The very top of the interface 200 generally includes a system bar 202. The system bar is displayed in both landscape orientation and portrait orientation. In general, the system bar 202 may be configured by an operating system of the controller, and may include text and/or icons indicating the network and/or cell signal strength, time of day, and battery level, among others. Hereinafter, references to the top of the screen refer to the top of the display interface 200 below the system bar 202. Further, since the user interface for the controller includes a touch sensitive display screen, the interface 200 may be interchangeably referred to as the interface, display screen, touch screen, display, or screen.

In portrait orientation, the interface 200 may be configured substantially according to the earlier description of the interface of a prior art controller as shown in FIG. 1. In the portrait orientation, the interface 200 displays a tab selector 205 at the top or bottom of the interface 200. A first tab selects a first view of a first menu, for example, a room list view, where each room in the network may be listed by name. Each listed room may indicate the name of the room, and or the type of media rendering device within the room. Other information may also be presented, for example, the type of media currently being rendered by the media rendering device in that room. Selecting a room in the room list selects a target room for selections in other tabs. Rooms in the room menu that include rendering devices under common control may be indicated visually, for example, by a commonly colored boundary.

A second tab in portrait orientation may select a second view, for example, a menu listing media sources, such as a playlist stored on the device, a broadcast playlist, or a streamed or broadcast media. Other media sources may include playlists stored on other devices available to the network 160 (FIG. 2). Selecting a media source in the list displays a track list, which may show media available from the media source, such as a media playlist. Selecting a track from the track list may cause the media center of the target room to render the track.

A third tab in portrait orientation brings up a third view, for example, a "now playing" view, indicating media currently playing in the target room. The now playing view may show an image associated with the playing media, such as an album cover. The now playing view may also display media rendering (playback) controls, such as a volume control, and transport controls, such as play, pause, replay, and skip backward/forward. Other rendering controls may include tone controls (bass, mid, treble) and/or balance. The user may display the current play queue, for example, by selecting the image or swiping downward on the now playing view display. The play queue may be edited from the now play queue screen, for example, deleting media from the play queue or adding media to the play queue.

In the landscape orientation, as shown by FIG. 3B, the display 200 presents three vertical tiles 250, 260, 270. The first tile 250 displays the first menu, the room list in the first embodiment, the second tile 260 displays the second menu, here the media source track list (playlist), and the third tile 270 displays a third menu, here the now playing queue. In general, the first tile 250 presents similar information to the information presented in the rooms tab of portrait orientation, and may therefore be referred to herein as the rooms tile 250. Since the rooms tile 250 occupies approximately one third of the screen area in landscape orientation as the rooms tab in the portrait orientation, the information presented in the rooms tile 250 may be reduced in comparison with the portrait orientation rooms tab, for example, by reducing the number of rooms listed. For example, the full list may be displayed by scrolling the displayed portion of the list.

In general, the second tile 260 presents similar information to the information presented in the music tab of portrait orientation, and may therefore be referred to herein as the music tile 260. Since the music tile 260 occupies approximately one third of the screen area in landscape orientation as the music tab in the portrait orientation, the information presented in the music tile 260 may be reduced in comparison with the portrait orientation music tab, for example, by reducing the number of sources listed. Like the music tab, the music tile 260 may be switched, for example by swiping the screen or selecting a media source, between a top level menu displaying a list of music sources, and a track level browsing view, displaying a list of tracks in the playlist of the selected media source.

In general, the third tile 270 presents similar information to the information presented in the now playing tab of portrait orientation, and may therefore be referred to herein as the now playing tile 270. Since the now playing tile 270 occupies approximately one third or less of the screen area in landscape orientation as the now playing tab in the portrait orientation, the information presented in the now playing tile 270 may be reduced in comparison with the portrait orientation now playing tab, for example, by reducing the number of sources listed. Like the now playing tab, the now playing tile 260 may be switched, for example by swiping or selecting a track, between a top level menu displaying information of the track corresponding to the media currently being rendered, to a play queue, displaying an ordered list of tracks in a queue for rendering. Each of the first tile 250, second tile 260, and the third tile 270 may be scrollable, to facilitate display of lists longer than may be feasible to be shown in their entirety in the available space.

Unlike the first tile 250 and second tile 260, the third tile 270 may not extend fully from the bottom of the screen to the system bar 202. Instead, the top portion of the third tile 270 may be displaced somewhat by a sub-menu, here a tool pallet 280. The tool pallet 280 may display one or more objects to assist the user in manipulating one or more of the tiles 250, 260, 270. For example, the tool pallet 280 may include an edit icon 281, a delete icon 282, and a favorites icon 283, among other icons. The edit icon 281 allows the user to mark and reorder one or more items. The delete icon 282 allows the user to clear only the marked items or delete the whole list at once (without having to mark many items). The form of an icon in the tool pallet 280 may change according to a context of the action. For example, the appearance of the edit icon 281 may change from a pencil to a check mark to allow the user to save edits that have been made.

The delete icon 282 may be used to remove an item from one of the tiles, for example, by dragging an object over the delete icon 282. The favorites icon 283 may act as a "Save as a Play list" button that lets the user save the contents of a list into a playlist for later recall. This saves the user from having to manually recreate the order of songs currently in the list. In alternative embodiments, the tool pallet 280 may be in the first tile 250 or second tile 260, or may be available as a pop-up menu. The tiles 250, 260, 270 may also contain other sub-menus.

In the first embodiment, the tiles 250, 260, 270 may be arranged to be hierarchical, where the first tile 250 represents a high level of objects, the second tile 260 represents a middle level of objects, and the third tile 270 represents a low level of objects, such that the high level objects may be considered to include the middle level objects, and the middle level object may be considered to include the low level objects. For example, a media player in a room may be represented by an object in the first tile 250, and be considered to include a playlist represented by an object in the second tile 260. While it may be desirable in some embodiments to arrange the tiles in a hierarchical fashion, alternative embodiments may adopt different arrangements.

Figure 4A:
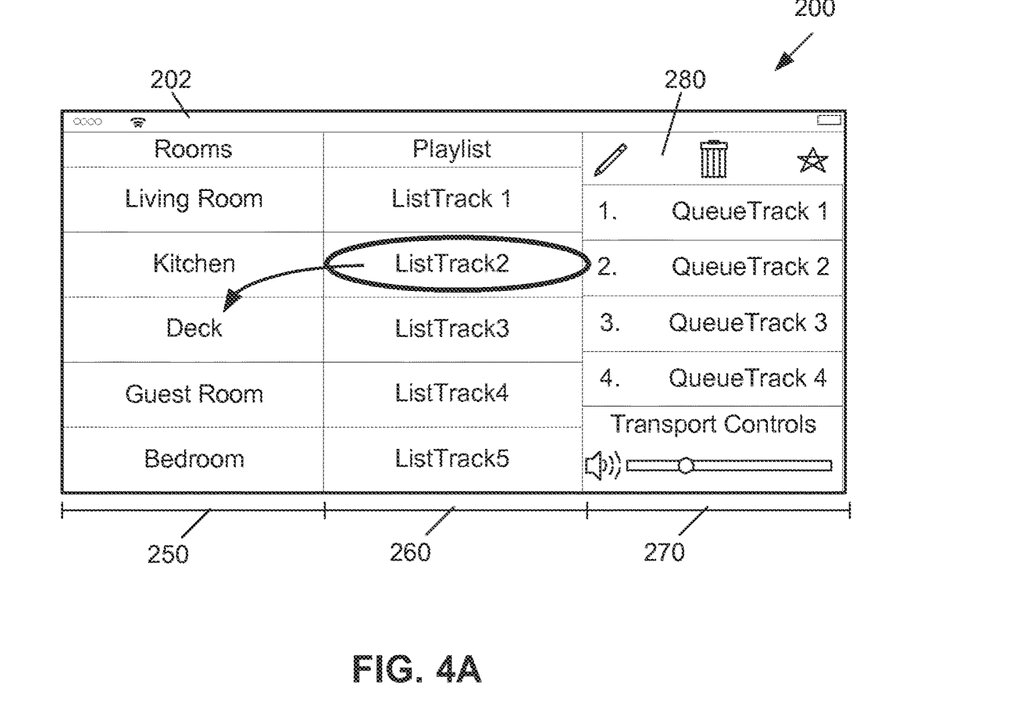
FIG. 4A is a schematic diagram of a screen of the first embodiment of the present invention in landscape orientation demonstrating a first drag-and-drop operation.

In contrast to portrait mode, where the content of only one menu is presented at a time, in landscape mode the user may drag-and-drop objects from one menu to another by dragging an object from one tile to another. For example, as shown in FIG. 4A a track from a playlist on the music tile 260 may be dragged to a room in the room tile 250, which corresponds to a room 101-105 (FIG. 2) in the house 100 (FIG. 2), the deck in this case, and in particular, to a media rendering device 111-115 (FIG. 2) located in the corresponding room 101-105 (FIG. 2). Depending upon how the media rendering device 111-115 (FIG. 2) in the selected room 101-105 (FIG. 2) is configured, the dragged track may be added to the play queue of the media rendering device 111-115 (FIG. 2), for example, at a head or a tail of the play queue. Furthermore, the now playing tile 270 may be updated to display the play queue of the selected media rendering device 111-115 (FIG. 2), with the play queue in the now playing tile 270 updated to include the dragged track.

Figure 4B:
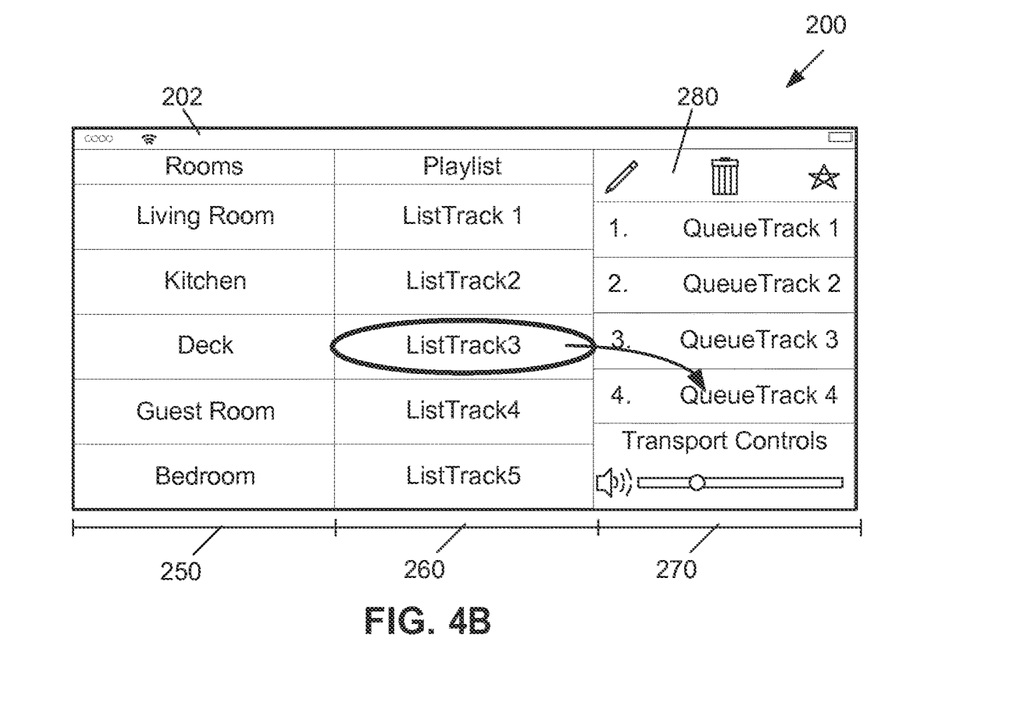
FIG. 4B is a schematic diagram of a screen of the first embodiment of the present invention in landscape orientation demonstrating a second drag-and-drop operation.
Figure 4C:
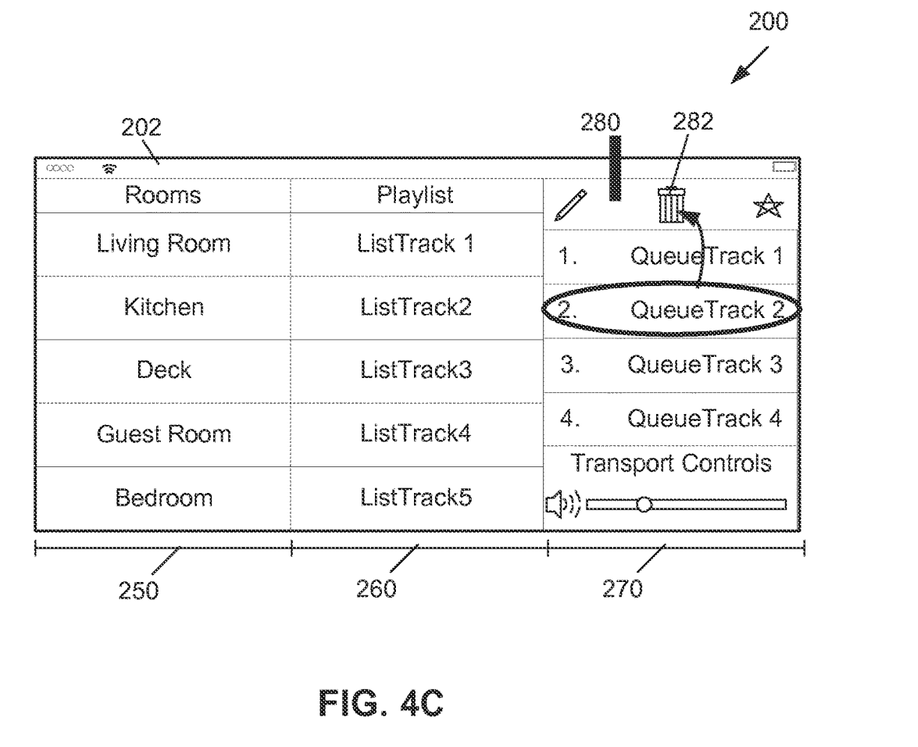
FIG. 4C is a schematic diagram of a screen of the first embodiment of the present invention in landscape orientation demonstrating a third drag-and-drop operation.
Figure 4D:
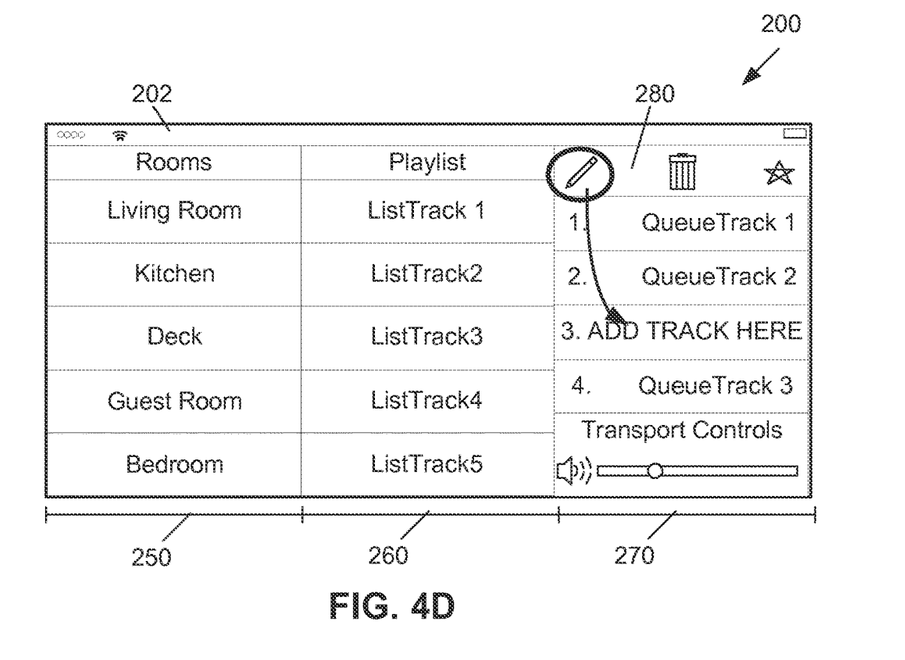
FIG. 4D is a schematic diagram of a screen of the first embodiment of the present invention in landscape orientation demonstrating a fourth drag-and-drop operation.

In another example, as shown in FIG. 4B a track from a playlist on the music tile 260 may be dragged to a desired position in the play queue in the now playing tile 270. As a result, the user effectively edits the play queue. Other implementations are also possible. For example, as shown in FIG. 4C, the user may delete a track from the play queue by dragging and dropping the track over the delete icon 282 on the tool pallet 280. As shown in FIG. 4D, the edit icon 281 may be dragged over a location in one of the tiles 250, 260, 270, in this case, the play queue in the now playing tile 270, causing an object to be inserted into the play queue at the designated location. The user may then populate the drawn in object by a subsequent action, for example, clicking on the drawn in object to bring up a selector window.

As with the music tab in portrait mode, the music tile 260 may be switched between a top level menu and one or more lower level menus, for example, by selecting a media source in the top level menu, which will then populate the music tile 260 with the playlist for the media source.

Other drag-and-drop actions are also possible. For example, the play queue in the now playing tile 270 may be dragged to a room in the room tile 250, causing the media rendering device 111-115 (FIG. 2) in the target room 101-105 (FIG. 2) to render media from the dragged play queue. As shown by these examples, the landscape mode facilitates simple and intuitive interaction between objects in different tiles 250, 260, 270, providing a more powerful control interface than that provided in portrait mode alone.

Figure 6:
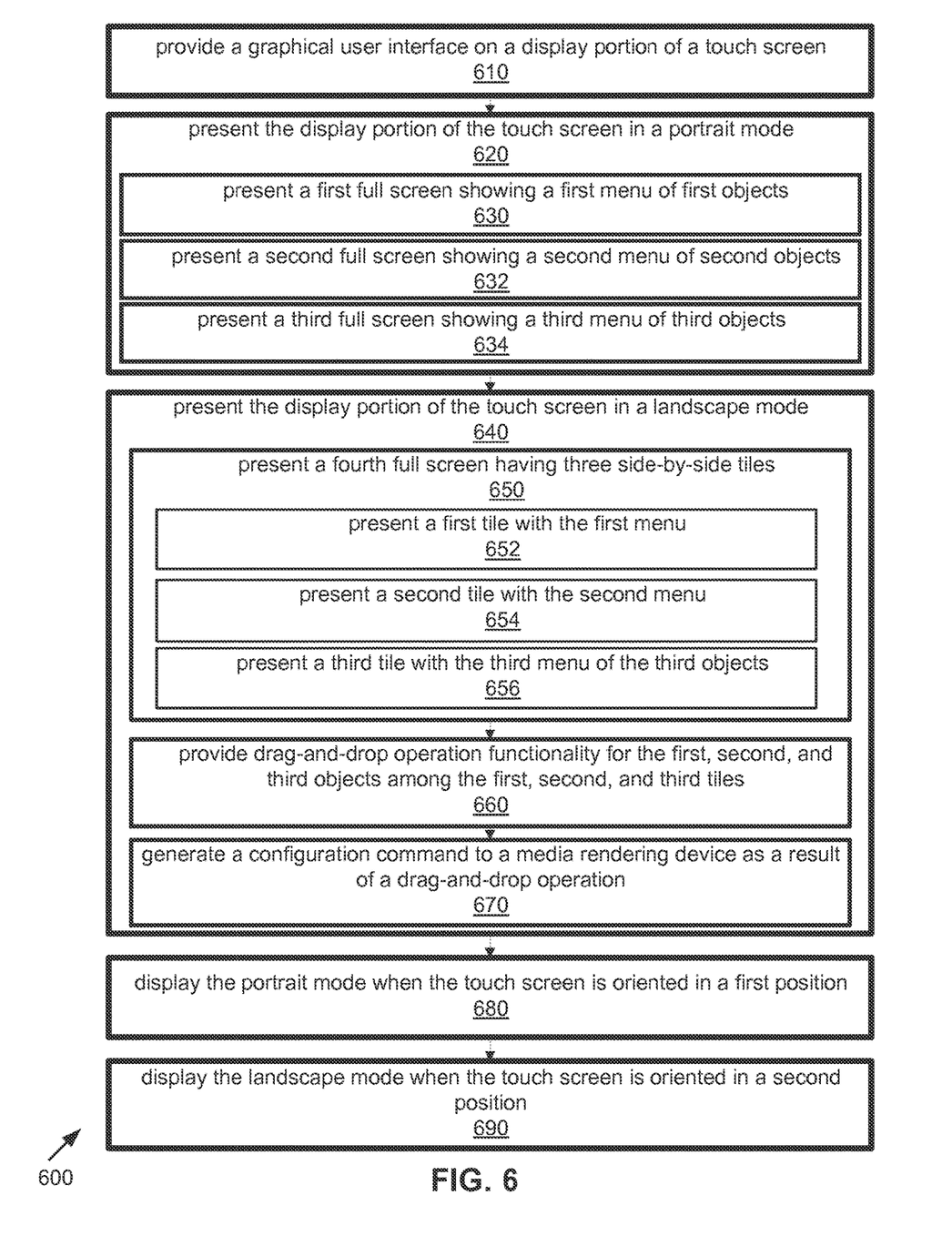
FIG. 6 is a flowchart of an exemplary method for controlling a media rendering device with a touch screen controller device.

FIG. 6 is a flowchart of an exemplary method 600 for controlling a media rendering device or system with a touch screen controller device. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. The method 600 is described with reference to FIGS. 2, 3A, and 3B.

A graphical user interface is provided on a display portion 200 of the touch screen, as shown by block 610. For example, the touch screen may be part of a tablet computer or smart mobile telephone or wearable computing device. The display portion 200 of the touch screen may be presented in a portrait mode, as shown by block 620. In portrait mode, a first menu, a second menu, or a third menu may be presented. A first full screen with a first menu of first objects is presented, as shown by block 630. A second menu with a second full screen of second objects is presented, as shown by block 632. A third menu with a third full screen of third objects is presented, as shown by block 634. When in portrait mode, the first menu, the second menu, and the third menu are not displayed concurrently. Instead, only the menu corresponding to the presently selected tab 205 is displayed. For example, in portrait mode a tab bar 205 may be displayed with which the user may select which of the first menu, the second menu, or the third menu to display.

The display portion 200 of the touch screen may be presented in a landscape mode, as shown by block 640. In the landscape mode, a fourth full screen is presented having three side-by-side tiles 250, 260, 270 substantially filling the fourth full screen, as shown by block 650. A first tile 250 is presented with the first menu of the first objects, as shown by block 652. A second tile 260 is presented with the second menu of the second objects, as shown by block 654. A third tile is presented with the third menu of the third objects, as shown by block 656. Drag-and-drop operation functionality is provided for the first, second, and third objects among the first, second, and third tiles, as shown by block 660. In particular, the landscape mode facilitates drag-and-drop functionality between the first, second, and third menus, which is not feasible in portrait mode, where the first, second, and third menus are not simultaneously displayed. A configuration command is generated to a media rendering device 111-115 as a result of a drag-and-drop operation, as shown by block 670. For example, dragging a track object to a room object may result in a media rendering device 111-115 located in a room 101-105 represented by the room object to render a media file represented by the track object.

The portrait mode is displayed when the touch screen is oriented in a first position, as shown by block 680. For example, the portrait mode is displayed when one of the two shorter edges of the touch-screen is oriented topmost. The landscape mode is displayed when the touch screen is oriented in a second position, as shown by block 690. For example, the landscape mode is displayed when one of the two longer edges of the touch-screen is oriented topmost.

Figure 5:
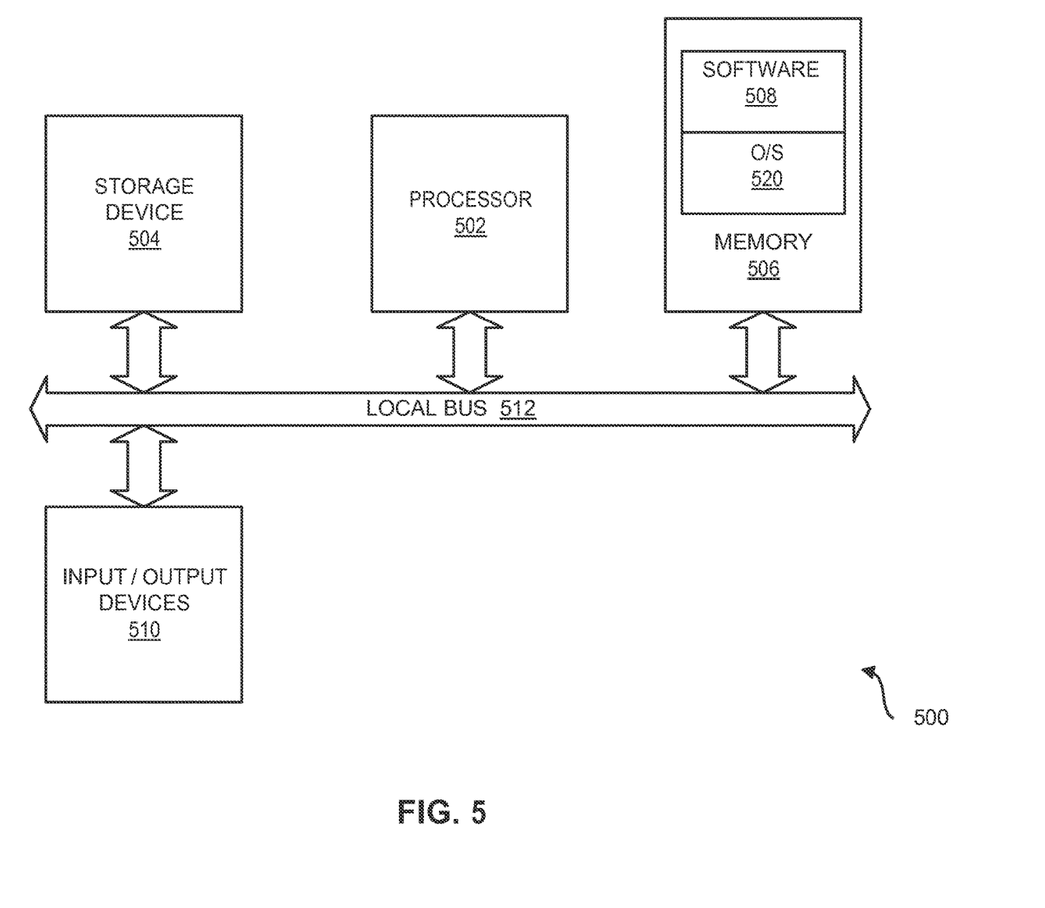
FIG. 5 is a schematic diagram illustrating an example of a system for executing functionality of the present invention.

As previously mentioned, the present system for executing the functionality described in detail above may be a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a touchscreen surface, a keyboard, mouse, scanner, microphone, etc. Furthermore, the I/O devices 510 may also include output devices, for example but not limited to, a printer, a touchscreen display, etc. Finally, the I/O devices 510 may further include devices that communicate via both inputs and outputs, for instance but not limited to, a modulator/demodulator (modem; for accessing another device, system, or network), a WiFi or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

While the embodiments above have described a landscape mode with three side-by-side tiles, in alternative embodiments the landscape mode may include two, four or more side-by-side tiles.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A controller for a media rendering device comprising:
   a touch display comprising a screen having a touch screen portion; and
   a processor and a memory containing non-transitory instructions that, when executed by the processor, perform the steps of:
   providing a graphical user interface on the touch screen portion;
   presenting the touch screen portion of the screen in a portrait mode comprising:
      a first full screen view presenting a first menu of first objects of an application executed by the processor; and
      a second full screen view presenting a second menu of second objects of the application, wherein the first menu is not displayed at the same time as the second menu in portrait mode; and
      a tab selector comprising a first tab configured to select the first full screen view and a second tab configured to select the second full screen view; and
   presenting the touch screen portion in a landscape mode comprising:
      a plurality of side-by-side tiles filling the touch screen portion when the touch display is in a landscape position, further comprising:
         a first tile presenting the first menu; and
         a second tile presenting the second menu,
         wherein the first tile and the second tile are displayed at the same time when in landscape mode;
      providing drag-and-drop operation functionality for the first and second objects between the first and second tiles in the landscape mode only so that one or more of the first objects may be dragged from the first menu of first objects and dropped into the second tile and/or one or more of the second objects may be dragged from the second menu of second objects and dropped into the first tile; and
      generating a configuration command to the media rendering device to adjust an operating parameter of the media rendering device as a result of a drag-and-drop operation between the first tile and the second tile; and
   configuring the touch display to display the portrait mode when oriented in a first position, and to display the landscape mode when oriented in a second position,
   wherein the tab selector is displayed in the portrait mode and not in the landscape mode.

2. The controller device of claim 1, wherein:
   the touch screen portion comprises a first edge opposite a third edge, and a second edge opposite a fourth edge;
   the first position comprises when the touch display is oriented with the first or third edge uppermost,
   the second position comprises when the touch display is oriented with the second or fourth edge uppermost.

3. The controller device of claim 1, wherein the configuration command is configured to modify a rendering parameter of the media rendering device.

4. The controller device of claim 1, wherein presenting the touch screen portion in a landscape mode further comprises displaying a sub-menu in a portion of one of the plurality of tiles.

5. The controller device of claim 4, wherein the sub-menu is configured to display one or more of the group consisting of an edit tool icon, a delete icon, and a favorites icon.

6. The controller device of claim 1, wherein:
   the first tile presents a subset of the first objects presented by the first menu; and/or
   the second tile presents a subset of the second objects presented by the second menu.

7. The controller device of claim 1, wherein the one menu is selected from the group consisting of the first menu of first objects of the application, the second menu of second objects of the application, and a third menu of third objects of the application, the plurality of side-by-side tiles further comprises a third tile presenting the third menu, and the processor is further configured to perform the steps of:
   providing drag-and-drop operation functionality for the first, second, and third objects among the first, second, and third tiles.

8. The controller device of claim 7, wherein presenting the touch screen portion in a portrait mode further comprises displaying a third tab configured to select the third menu.

9. The controller device of claim 7, wherein presenting the touch screen portion in a landscape mode further comprises displaying a sub-menu in a portion of the first and/or second tile and/or third tile.

10. The controller device of claim 7, wherein:
    the first tile presents a subset of the first objects presented by the one menu in portrait mode; and/or
    the second tile presents a subset of the second objects presented by the second menu; and/or
    the third tile presents a subset of the third objects presented by the third menu.

11. A method for controlling a media rendering device with a touch display controller device comprising a processor and a memory configured to store non-transitory instructions for execution by the processor, comprising the steps of:
    providing a graphical user interface on a touch screen portion of the touch display;
    presenting the touch screen portion in a portrait mode comprising the further steps of:
       presenting on the touch screen one menu selected from the group consisting of a first full screen view presenting a first menu of first objects of an application executed by the processor and a second full screen view presenting a second menu of second objects of the application executed by the processor, wherein the first menu is not displayed at the same time as the second menu in portrait mode; and presenting a tab selector comprising a first tab configured to select the first full screen view and a second tab configured to select the second full screen view; and presenting the touch screen portion in a landscape mode comprising the further steps of:

presenting a plurality of side-by-side tiles filling the touch screen portion when the touch display is in a landscape position, further comprising:

presenting a first tile comprising the first menu; and presenting a second tile comprising the second menu, wherein the first tile and the second tile are displayed at the same time when in landscape mode;

providing drag-and-drop operation functionality for the first and second objects among the first and second tiles in the landscape mode only so that one or more of the first objects may be dragged from the first menu of first objects and dropped into the second tile and/or one or more of the second objects may be dragged from the second menu of second objects and dropped into the first tile;

generating a configuration command to the media rendering device to adjust an operating parameter of the media rendering device as a result of a drag-and-drop operation between the first tile and the second tile;

displaying the portrait mode when the touch display is oriented in a first position; and displaying the landscape mode when the touch display is oriented in a second position, wherein the tab selector is displayed in the portrait mode and not in the landscape mode.

12. A system operating in a communication network, comprising:

a controller device in communication with the network comprising:

a rectangular touch display including a first edge opposite a third edge, and a second edge opposite a fourth edge; and a processor and a memory containing non-transitory instructions that, when executed by the processor, perform the steps of:

providing a graphical user interface on a touch screen portion of the touch display;

presenting the touch screen portion of the touch display in a portrait mode one menu selected from the group consisting of a first full screen view presenting a first menu of first objects of an application executed by the processor and a second full screen view presenting a second menu of second objects of the application executed by the processor, wherein the first menu is not displayed at the same time as the second menu in portrait mode;

presenting a tab selector comprising a first tab configured to select the first full screen view and a second tab configured to select the second full screen view;

presenting the touch screen portion in a landscape mode when the controller is in a landscape position, landscape mode comprising:

a plurality of side-by-side tiles filling the touch-screen portion in landscape mode, further comprising:

a first tile presenting the first menu; and a second tile presenting the second menu, wherein the first tile and the second tile are displayed at the same time when in landscape mode;

providing drag-and-drop operation functionality for the first and second objects among the first and second tiles in the landscape mode only so that one or more of the first objects may be dragged from the first menu of first objects and dropped into the second tile and/or one or more of the second objects may be dragged from the second menu of second objects and dropped into the first tile;

generating a configuration command to a media rendering device to adjust an operating parameter of the media rendering device as a result of a drag-and-drop operation between the first tile and the second tile; and configuring the touch display to display the portrait mode when oriented in a first position, and to display the landscape mode when oriented in a second position; and a first media rendering device in communication with the network configured to receive a configuration command from the controller device and adjust an operating parameter according to the configuration command.

13. The system of claim 12, further comprising a second media rendering device in communication with the network configured to receive a configuration command from the controller device, wherein the controller is further configured to perform the steps of:

assigning one of the first objects to represent the first media rendering device;

assigning another of the first objects to represent the second media rendering device;

generating a configuration command to the first media rendering device as a result of performing a drag-and-drop operation from a second object of the second to the object representing the first media rendering device.

14. The system of claim 12, wherein:

the touch screen portion comprises a first edge opposite a third edge, and a second edge opposite a fourth edge;

the first position comprises when the touch display is oriented with the first or third edge uppermost, the second position comprises when the touch display is oriented with the second or fourth edge uppermost.

15. The system of claim 12, wherein the configuration command is configured to modify a rendering parameter of the media rendering device.

16. The system of claim 12, wherein presenting the touch screen portion in a portrait mode further comprises:

displaying a first tab configured to select the first menu; and displaying a second tab configured to select the second menu.

17. The system of claim 12, wherein presenting the touch portion screen in a landscape mode further comprises displaying a sub-menu in a portion of the first and/or second tile.

18. The system of claim 17, wherein the sub-menu is configured to display one or more of the group consisting of a drawing tool icon, a trashcan icon, and a favorites icon.

19. The system of claim 12, wherein:

the first tile presents a subset of the first objects presented by the first menu; and/or the second tile presents a subset of the second objects presented by the second menu.

20. A computer readable media comprising non-transitory instructions which, when executed by a processor, are configured to direct a touch display controller for a media rendering system to perform the steps of:
- providing a graphical user interface on a touch screen portion of the touch display;
- presenting the touch screen portion of the touch display in a portrait mode comprising:
  - one menu selected from the group consisting of a first full screen view presenting a first menu of first objects of an application executed by the processor and a second full screen view presenting a second menu of second objects of the application,
  - wherein the first menu is not displayed at the same time as the second menu in portrait mode;
- presenting a tab selector comprising a first tab configured to select the first full screen view and a second tab configured to select the second full screen view;
- presenting on the touch screen portion a landscape mode comprising:
  - a plurality of side-by-side tiles filling the touch screen portion when the touch display is in a landscape position, further comprising:
    - a first tile presenting the first menu; and
    - a second tile presenting the second menu,
    - wherein the first tile and the second tile are displayed at the same time when in landscape mode; and
- providing drag-and-drop operation functionality for the first and second objects among the first and second tiles in the landscape mode only so that one or more of the first objects may be dragged from the first menu of first objects and dropped into the second tile and/or one or more of the second objects may be dragged from the second menu of second objects and dropped into the first tile;
- generating a configuration command to the media rendering device to adjust an operating parameter of the media rendering device as a result of a drag-and-drop operation between the first tile and the second tile; and
- configuring the touch display in the portrait mode when oriented in a first position, and in the landscape mode when oriented in a second position,
- wherein the tab selector is displayed in the portrait mode and not in the landscape mode.

* * * * *